United States Patent
Benhase et al.

(10) Patent No.: US 8,683,130 B2
(45) Date of Patent: Mar. 25, 2014

(54) FABRICATING KEY FIELDS

(75) Inventors: Michael T. Benhase, Tucson, AZ (US);
Susan K. Candelaria, Tucson, AZ (US);
Chung M. Fung, San Francisco, CA (US);
Lokesh M. Gupta, Tucson, AZ (US);
Joseph S. Hyde, II, Tucson, AZ (US);
Matthew J. Kalos, Tucson, AZ (US);
Beth A. Peterson, Tucson, AZ (US);
Donald P. Terry, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 13/082,288

(22) Filed: Apr. 7, 2011

(65) Prior Publication Data

US 2012/0260043 A1    Oct. 11, 2012

(51) Int. Cl.
*G06F 12/00* (2006.01)
*G06F 13/00* (2006.01)
*G06F 13/28* (2006.01)

(52) U.S. Cl.
USPC .......................................... 711/133; 711/112

(58) Field of Classification Search
USPC .............................................. 711/4, 112, 133
See application file for complete search history.

(56) References Cited

U.S. PATENT DOCUMENTS

| | | | |
|---|---|---|---|
| 5,528,755 A | 6/1996 | Beardsley et al. |
| 5,535,372 A | 7/1996 | Benhase et al. |
| 6,304,940 B1 | 10/2001 | Beardsley |
| 6,470,421 B1 | 10/2002 | Bui et al. |
| 7,480,850 B2 | 1/2009 | Arataki et al. |
| 2002/0112205 A1 | 8/2002 | Gross et al. |

FOREIGN PATENT DOCUMENTS

EP    0550154 A1    7/1993

*Primary Examiner* — Alford Kindred
*Assistant Examiner* — Rocio Del Mar Perez-Velez
(74) *Attorney, Agent, or Firm* — Griffiths & Seaton PLLC

(57) ABSTRACT

Exemplary methods, computer systems, and computer program products for fabricating key fields by a processor device in a computer environment are provided. In one embodiment, the computer environment is configured for, as an alternative to reading Count-Key-Data (CKD) data in order to change the key field, providing a hint to fabricate a new key field, thereby overwriting a previous key field and updating the CKD data.

20 Claims, 6 Drawing Sheets

FABRICATING KEY FIELDS

BACKGROUND OF THE INVENTION

Field of the Invention

The present invention relates generally to computers, and more particularly, to fabricating key fields in a computing storage environment.

Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. The disk drives may be configured in an array, such as a Redundant Array of Independent Disks (RAID) topology, to provide data security in the event of a hardware or software failure. The data storage systems may be connected to a host, such as a mainframe computer. The disk drives in many data storage systems have commonly been known as Direct Access Storage Devices (DASD). DASD devices typically store data on a track, which is a circular path on the surface of a disk on which information is recorded and from which recorded information is read.

These disk drives implement a Count, Key, and Data (CKD) format on the disk drives. A record is a set of one or more related data items grouped together for processing, such that the group may be treated as a unit. Disk drives utilizing the CKD format have a special "address mark" on each track that signifies the beginning of a record on the track. After the address mark is a three-part record beginning with the count field that serves as the record ID and also indicates the lengths of the optional key field and the data field, both of which follow. Also on the track, there is normally one Home Address (HA) that defines the physical location of the track and the condition of the track. The HA typically contains the physical track address, a track condition flag, a cylinder number (CC) and a head number (HH). The combination of the cylinder number and the head number indicates the track address, commonly expressed in the form CCHH. The HA contains the "physical track address" which is distinguished from a "logical track address." Some operating systems, such as the IBM Virtual Machine (VM) operating system, employ a concept of "virtual disks" referred to as user mini-disks, and thus it is necessary to employ logical addresses for the cylinders rather than physical addresses.

In addition, within a storage area network, Write Ahead Data Set (WADS) tracks may be included. The write-ahead data set (WADS) is a small DASD data set containing a copy of log records reflecting committed operations in the on-line data set OLDS buffers that have not yet been written to the OLDS. WADS space is continually reused after the records it contains are written to the OLDS.

The computer systems, as previously described, use Input/output (I/O) operations to transfer data between memory and input/output devices of a processing environment. Specifically, data is written from memory to one or more input/output devices, and data is read from one or more input/output devices to memory by executing input/output operations. To facilitate processing of input/output operations, an input/output subsystem of the processing environment is employed. The input/output subsystem is coupled to main memory and the input/output devices of the processing environment and directs the flow of information between memory and the input/output devices. One example of an input/output subsystem is a channel subsystem. The channel subsystem uses channel paths as communications media. Each channel path includes a channel coupled to a control unit; the control unit being further coupled to one or more input/output devices.

The channel subsystem employs channel command words to transfer data between the input/output devices and memory. A channel command word (CCW) specifies the command to be executed, and for commands initiating certain I/O operations, it designates the memory area associated with the operation, the action to be taken whenever transfer to or from the area is completed, and other options.

During input/output processing, a list of channel command words is fetched from memory by a channel. The channel parses each command from the list of channel command words and forwards a number of the commands, each command in it's own entity, to a control unit (processor) coupled to the channel. The control unit then processes the commands. The channel tracks the state of each command and controls when the next set of commands are to be sent to the control unit for processing. The channel ensures that each command is sent to the control unit in it's own entity. Further, the channel infers certain information associated with processing.

SUMMARY OF THE DESCRIBED EMBODIMENTS

In CKD architecture, the records may consist of a count field, an optional key field, and an optional data field. A record on the drive may have these customer fields, but also supporting information used to ensure an understanding of the record on the track and to provide error checking as the record is transferred through the control unit between the host and the drive. A variety of commands to format, read, and update write records/tracks as a whole or for specific fields may be defined. When a record has a key field, and an update write only command affects a data field, the records/tracks to be written must be staged from the drive to cache to be read before being updated. Therefore, a need exists for a mechanism for fabricating key fields to increase system performance, for example, eliminating track stages for certain tracks and CKD command chains.

Accordingly, and in view of the foregoing, various exemplary methods, computer systems, and computer program products for fabricating key fields by a processor device in a computer environment are provided. In one embodiment, the computer environment is configured for, as an alternative to reading Count-Key-Data (CKD) data in order to change the key field, providing a hint to fabricate a new key field, thereby overwriting a previous key field and updating the CKD data.

In addition to the foregoing exemplary embodiment, various other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

Figure 1:
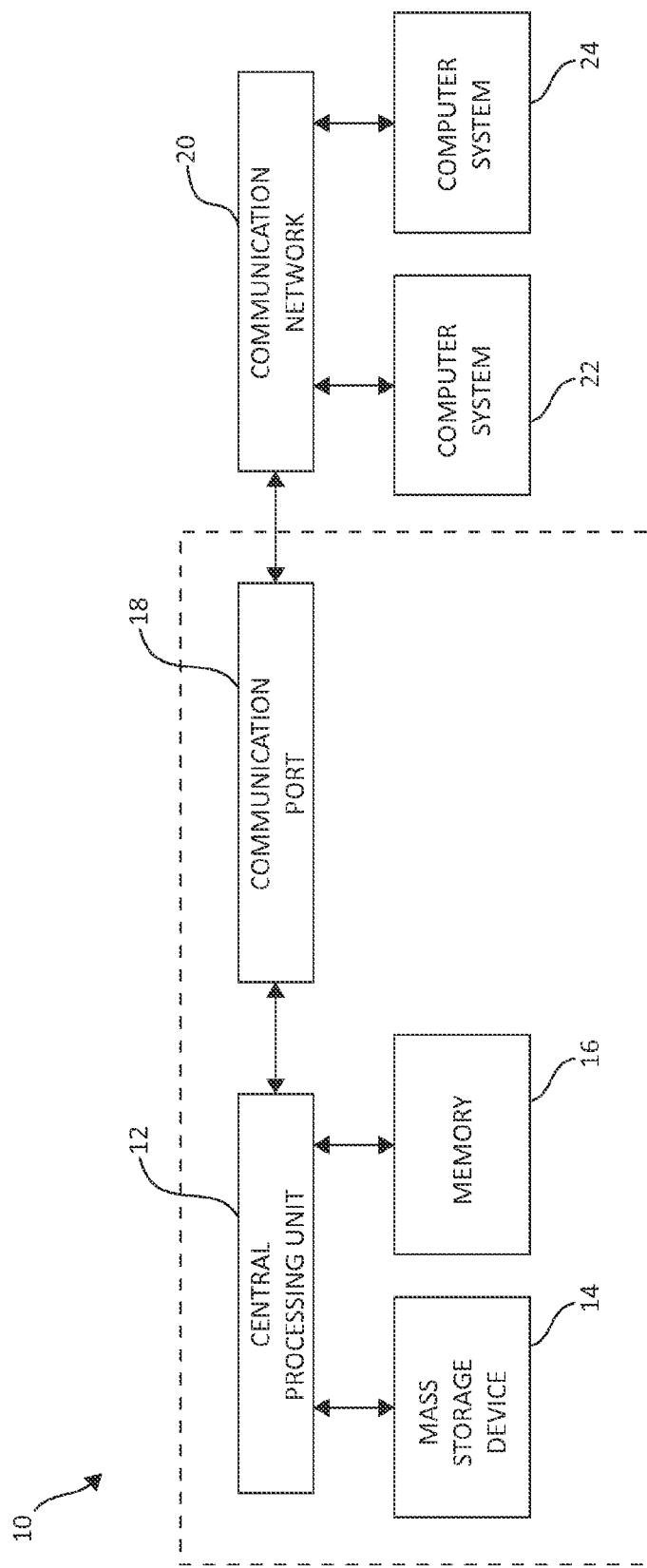
FIG. 1 illustrates a computer storage environment having an example storage device in which aspects of the present invention may be realized.

In CKD architecture, the records consist of a count field, an optional key field, and an optional data field. In one embodiment, by way of example only, in the DS8K implementation, a record on a drive will not only have these customer fields, but also supporting information used to ensure an understanding of the record on the track and to provide error checking as the record is transferred through a control unit between a host and the drive. A record may have a 32 byte header that includes the 8 byte count field and an longitudinal redundancy checking (LRC). If there is a key field, it will have field cyclic redundancy checking (CRC) and field LRC properly aligned after the key bytes. If there is a data field, the data field may also have a field CRC and field LRC properly aligned after the data bytes. A key field may be a field or set of fields of a database table, which together may form a unique identifier for a database record, e.g., a table entry. The aggregate of these fields may be referred to simply as "the key." The key fields may also define searches. The list of key values may also be embedded in a non-key character string fields. In addition, there may be a padding of 0's to properly align where mentioned above. Moreover, metadata, containing information about associated tracks, is stored in a cache in the storage controller and permanently on the storage devices. The metadata includes a track format description (TFD), which among other information includes an indication of whether tracks of the volume have been initialized. All sectors of an uninitialized track may contain zeros. A track may be considered initialized once it has a valid record.

In one embodiment, the zOS architecture defines a variety of commands to format, read, and update write records as a whole or for specific fields. For an update write, it is possible to only update the data field of a record. To allow for record validation and to optimize direct memory access (DMA) hardware utilization, the unwritten portions of the record are read prior to updating just the specific fields from the host. However, it is possible to fabricate a header based on orientation and associated metadata that may describe the track format and identification (IDs). The count fields may consist of information that may be captured in internal control unit structures when the count field has regular IDs. Currently, there is no mechanism for fabricating anything else since the key and data fields are strictly user data and may be set to any value.

However, when a record has a key field and an update write only affects a data field, the records to be written must be staged from the drive to cache to be read before updated. A write access data set (WADS) will update records/tracks multiple times during processing. It is possible to destage an active track because of the time between accesses. Thus, the accesses for the WADS dataset may see multiple cache miss penalties and a decrease in performance. One way to address cache misses and increase performance is to remove the need of staging. This may be accomplished by a mechanism configured to provide a hint to fabricate a key field with a known format and content for the elimination of track stages and CKD command chains.

The illustrated embodiments described, following, serve to address the issues described previously by fabricating a key field and overwriting a previous key field while updating CKD data. In one embodiment, the mechanisms of the illustrated embodiments provide a hint to allow for the fabrication of key field with a known format and content allowing for the elimination of track stages for certain tracks and CKD command chains.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices can include hard disk drive (HDD) devices, which can be configured in a redundant array of independent disks (RAID). The backup operations further described can be executed on device(s) 14, located in system 10 or elsewhere. Memory device 16 can include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2:
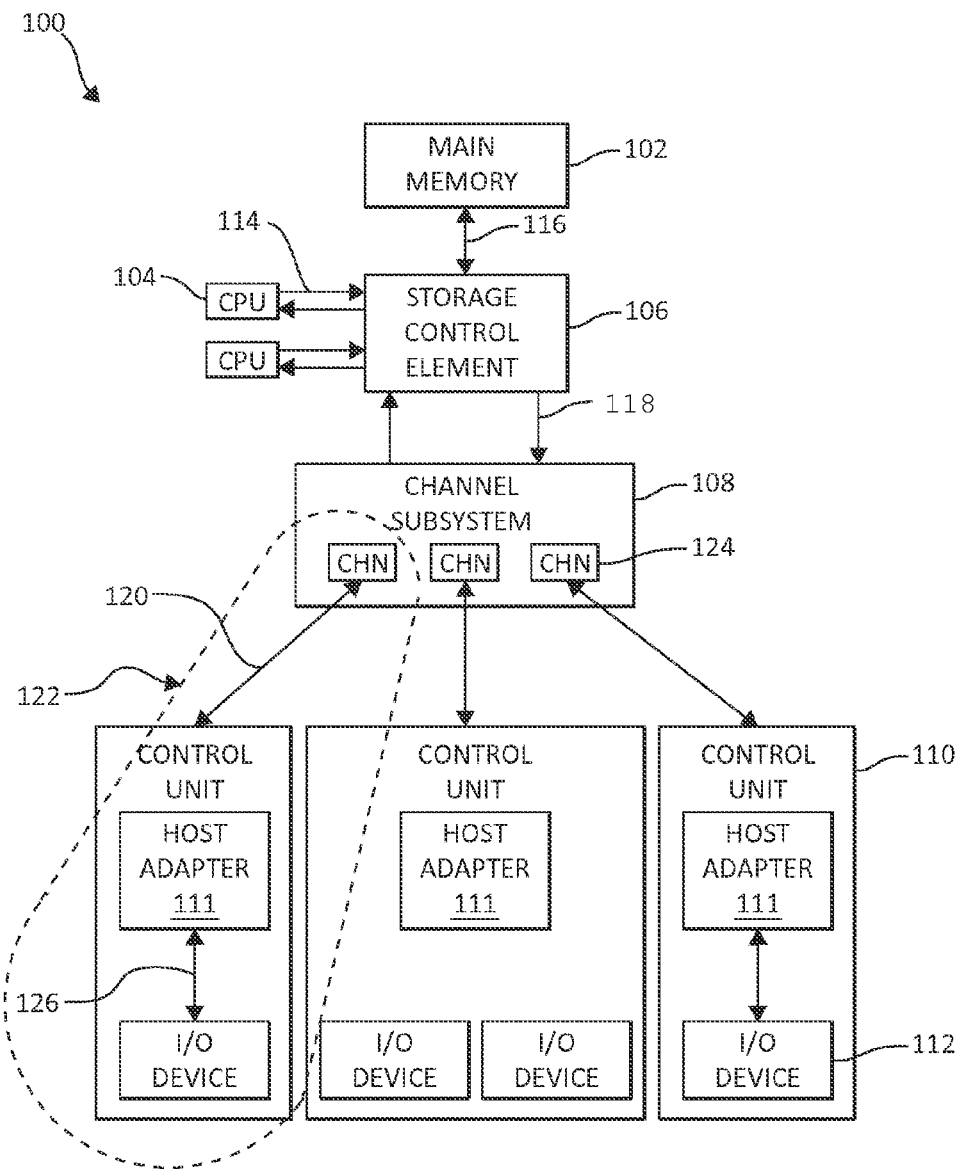
FIG. 2 illustrates an exemplary processing environment incorporating and using one or more aspects in which the present invention may be realized.

FIG. 2 illustrates an exemplary processing environment incorporating and using one or more aspects in which the present invention may be realized. One example of a processing environment incorporating and using one or more aspects of the present invention is described with reference to FIG. 1. Processing environment 100 includes, for instance, a main memory 102, one or more central processing units (CPU) 104, a storage control element 106, a channel subsystem 108, one or more control units 110 and one or more input/output (I/O) devices 112, each of which is described below.

Main memory 102 stores data and programs, which are input from input devices 112. Main memory 102 is directly addressable and provides for high-speed processing of data by central processing units 104 and channel subsystem 108. Central processing unit 104 is the controlling center of environment 100. It contains the sequencing and processing facilities for instruction execution, interruption action, timing functions, initial program loading, and other machine-related functions. Central processing unit 104 is coupled to storage control element 106 via a connection 114, such as a bidirectional or unidirectional bus. Storage control element 106 is coupled to main memory 102 via a connection 116, such as a bus; to central processing units 104 via connection 114; and to channel subsystem 108 via a connection 118. Storage control element 106 controls, for example, the queuing and execution of requests made by CPU 104 and channel subsystem 108. Channel subsystem 108 is coupled to storage control element 106, as described above, and to each of the control units via a connection 120, such as a serial link. Channel subsystem 108 directs the flow of information between input/output devices 112 and main memory 102. It relieves the central processing units of the task of communicating directly with the input/output devices and permits data processing to proceed concurrently with input/output processing. The channel subsystem uses one or more channel paths 122 as the communication links in managing the flow of information to or from input/output devices 112. As a part of the input/output processing, channel subsystem 108 also performs the pathmanagement functions of testing for channel path availability, selecting an available channel path and initiating execution of the operation with the input/output devices.

Each channel path 122 includes a channel 124 (channels are located within the channel subsystem, in one example, as shown in FIG. 1), one or more control units 110 and one or more connections 120. In another example, it is also possible to have one or more dynamic switches as part of the channel path. A dynamic switch is coupled to a channel and a control unit and provides the capability of physically interconnecting any two links that are attached to the switch. Also located within channel subsystem 108 are subchannels (not shown). One subchannel is provided for and dedicated to each input/output device accessible to a program through the channel subsystem. A subchannel (e.g., a data structure, such as a table) provides the logical appearance of a device to the program. Each subchannel provides information concerning the associated input/output device 112 and its attachment to channel subsystem 108. The subchannel also provides information concerning input/output operations and other functions involving the associated input/output device. The subchannel is the means by which channel subsystem 108 provides information about associated input/output devices 112 to central processing units 104, which obtain this information by executing input/output instructions.

Channel subsystem 108 is coupled to one or more control units 110. Each control unit provides the logic to operate and control one or more input/output devices and adapts, through the use of common facilities, the characteristics of each input/output device to the link interface provided by the channel. The common facilities provide for the execution of input/output operations, indications concerning the status of the input/output device and control unit, control of the timing of data transfers over the channel path and certain levels of input/output device control.

Each control unit 110 is attached via a connection 126 (e.g., a bus) to one or more input/output devices 112. Input/output devices 112 receive information or store information in main memory 102 and/or other memory. Examples of input/output devices include card readers and punches, magnetic tape units, direct access storage devices, displays, keyboards, printers, pointing devices, teleprocessing devices, communication controllers and sensor based equipment, to name a few.

One or more of the above components of the processing environment are further described in "IBM® z/Architecture Principles of Operation," Publication No. SA22-7832-04, 5th Edition, September 2005; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995, which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

In one embodiment, it should be noted, as a preliminary matter, when constructing the CKD command chain to do an update for a data field, first, it may be essential to orient to the correct track addressing and control command(s). The control unit may perform this function. The addressing and control commands such as Prefix (PFX) or Define Extent and Locate Record (DX/LR) are used to give information to the control unit to help the control unit understand how the application will be running and what commands will follow. Based on the parameters of the addressing and control commands, the control unit may optimize its own algorithms and leverage the information for increased performance.

Figure 3:
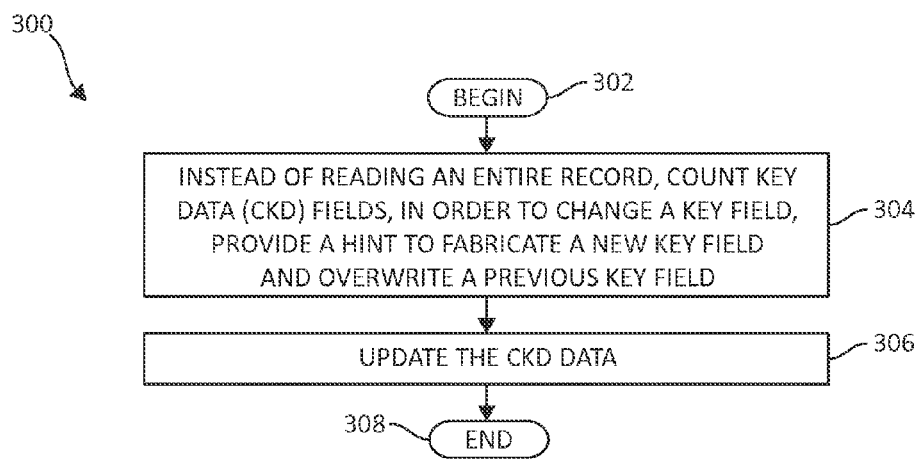
FIG. 3 is a flowchart illustrating an exemplary method 300 of providing a hint for fabricating a new key field.

FIG. 3 is a flowchart illustrating an exemplary method 300 of fabricating a new key field. The method 300 begins (step 302), as an alternative to or instead of reading Count-Key-Data (CKD) data in order to change the key field, providing a hint to fabricate a new key field wherein a previous key field is overwritten and the CKD data is updated (step 304 and step 306). The hint is given in advance allowing the controller to fabricate a new key field and overwrite the previous key field. The hint itself may be in the form of a command for processing the hint and even include one or more restrictions for rejecting the hint. Moreover, the hint may be a command, flag, bit, set of bits, a high bit, a low bit, a software hint, a notification, hint logic, and/or other form of indication. This list is not to be interpreted as an exclusive list, but may include other computing techniques or applications for the mechanisms of the illustrated embodiments to create a hint. The CKD (Count-Key-Data) data may be for non-volatile storage NVS. The method 300 then ends (step 308).

Figure 4:
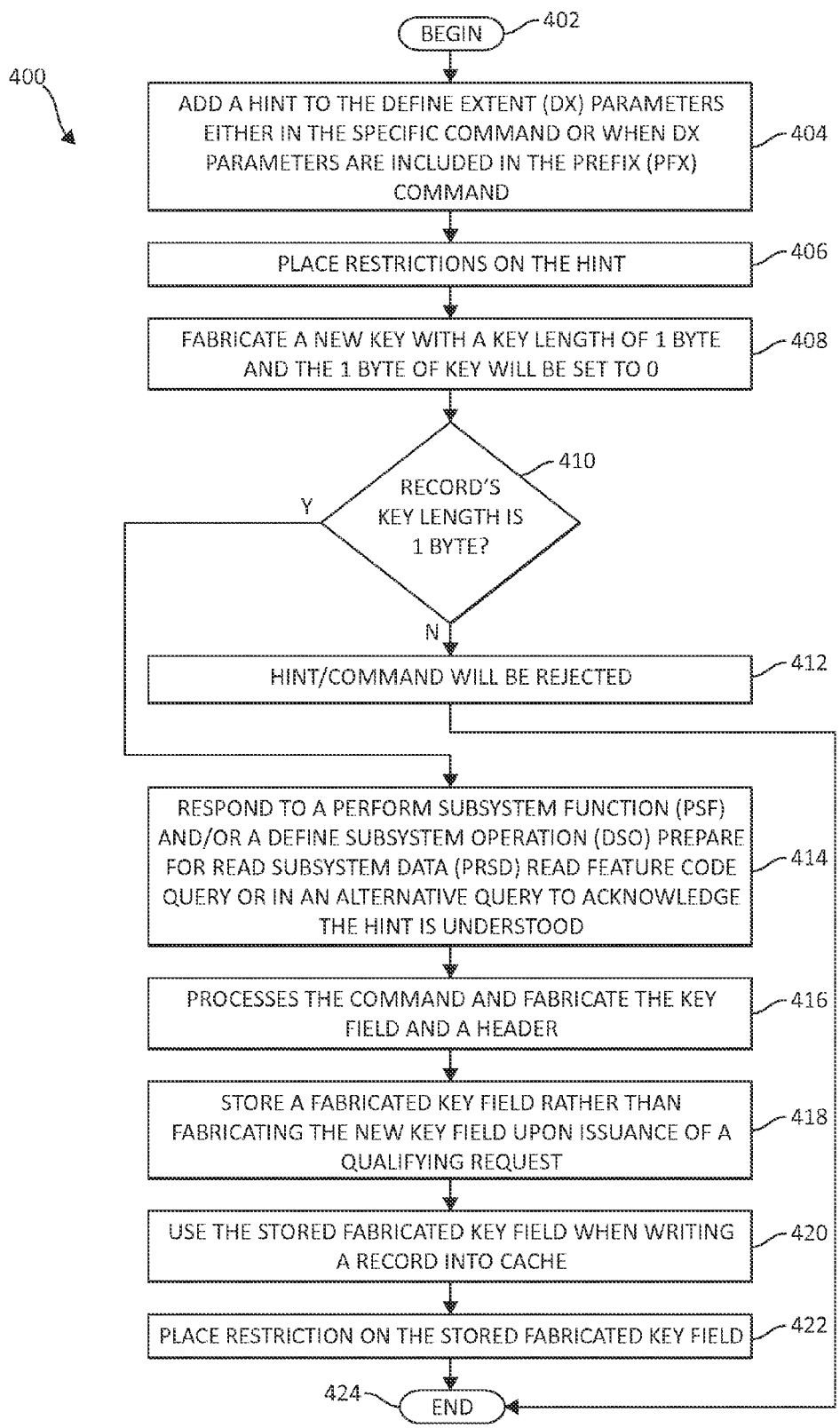
FIG. 4 is an additional flowchart illustrating an exemplary method 400 for providing a hint to fabricate a new key field.

FIG. 4 is a flowchart illustrating an exemplary method 400 for providing a hint to fabricate a new key field. The method 400 begins (step 402) by adding a hint to the Define Extent (DX) parameters either in the specific command or when DX parameters are include in the Prefix (PFX) command (step 404). Restrictions are placed on the hint (step 406). A new key is fabricated with a key length of 1 byte and the 1 byte of key will be set to 0 (step 408). The method 400 will check and determine if a record's key length is 1 byte (step 410). If the record's key length is not 1 byte the hint/command will be rejected (step 412) and the method will end (step 422). If a record's key length is 1 byte, the method 400 will respond to a perform a subsystem function (PSF) and/or a define subsystem operation (DSO) prepare for read subsystem data (PRSD) Read Feature Code Query, or an alternative query to acknowledge the hint is understood (step 414). The PRSD may be a part of either the PSF or the DSO command. The PRSD Read Feature Code Query may be performed as a separate process prior to issuing a command with the hint. The mechanisms of the illustrated embodiments may have previously performed the RFC work at an earlier time in order to know if the control unit would understand the hint and may send the hint in a subsequent write chain.

The command is processed and the key field and a header is fabricated (step 416). In one embodiment, a header may not always be predicted. In such a situation, the mechanisms of the illustrated embodiments may stage a record prior to updating the data field in order to get the count field of interest. Also, the key field may be obtained from the staged record. In the event it is possible to predict the header, staging a record may not be necessary to obtain the key field if fabrication is possible for the key field.

The fabricated key field is stored for future use rather than refabricating the new key field upon issuance of a qualifying request (step 418). The stored fabricated key field is used when writing a record into cache (step 420). A restriction is instituted, created, or place on the stored fabricated key field. (422). The method then ends (step 424).

In one embodiment, by way of example only, a new hint may be added to the Define Define Extent parameters either in the specific command or when the DX parameters are included in the PFX command. The hint, itself, may be a command. This hint may inform the mechanisms of the illustrated embodiments, for example a control unit, that it is permissible to fabricate a key field. Restrictions may be placed on the hint. The restrictions may be determined and altered as required for the mechanisms of the illustrated embodiments. In one embodiment, the restriction indicates the hint is only valid for a 'write any' domain. The fabricated key may have a key length of 1 byte and the 1 byte of the key may be set to 0. If the record's key length is not 1 byte, the command may be rejected. With a valid hint/command, the control unit would tell the system, processor, and/or software it understands such a hint via the response to a PSF/DSO PRSD Read Feature Code Query, though any such computing handshake may be accomplished in an alternative query (such as Read Device Characteristics or another PRSD query). As mentioned previously, the mechanisms of the illustrated embodiments will respond to a perform a subsystem function (PSF) and/or a define subsystem operation (DSO) prepare for read subsystem data (PRSD) Read Feature Code Query, or an alternative query to acknowledge the hint is understood. The PRSD may be a part of either the PSF or the DSO command. The PRSD Read Feature Code Query may be performed as a separate process prior to issuing a command with the hint. The mechanisms of the illustrated embodiments may have previously performed the RFC work at an earlier time in order to know if the control unit would understand the hint and may send the hint in a subsequent write chain.

Therefore, since the Write Update Data command may be valid in the 'write any' domain, when the control unit processes the command (hint), the control unit will recognize that the control unit is allowed to fabricate the key field. Thus, the control unit is capable and able to fabricate a header and the key field without the need or requirement to stage the record. However, in one embodiment, a header may not always be predicted. In such a situation, the mechanisms of the illustrated embodiments may stage a record prior to updating the data field in order to get the count field of interest. Also, the key field may be obtained from the staged record. In the event it is possible to predict the header, staging a record may not be necessary to obtain the key field if fabrication is possible for the key field.

Moreover, in one embodiment, instead of refabricating a new key field, the mechanisms of the illustrated embodiments, allow the fabricated key field to be stored in place of refabricating the new key field upon issuance each time of a qualifying request. The control unit may simply store the fabricated key field on a host adapter. The stored key field may be used when writing the entire record into cache once the data bytes have been transferred from the host. The stored key field may contain more than just a single byte of 0, but also padding to a 4-byte boundary, CRC across these 4 bytes of 0 and LRC across the 0s and the CRC.

Figure 5:
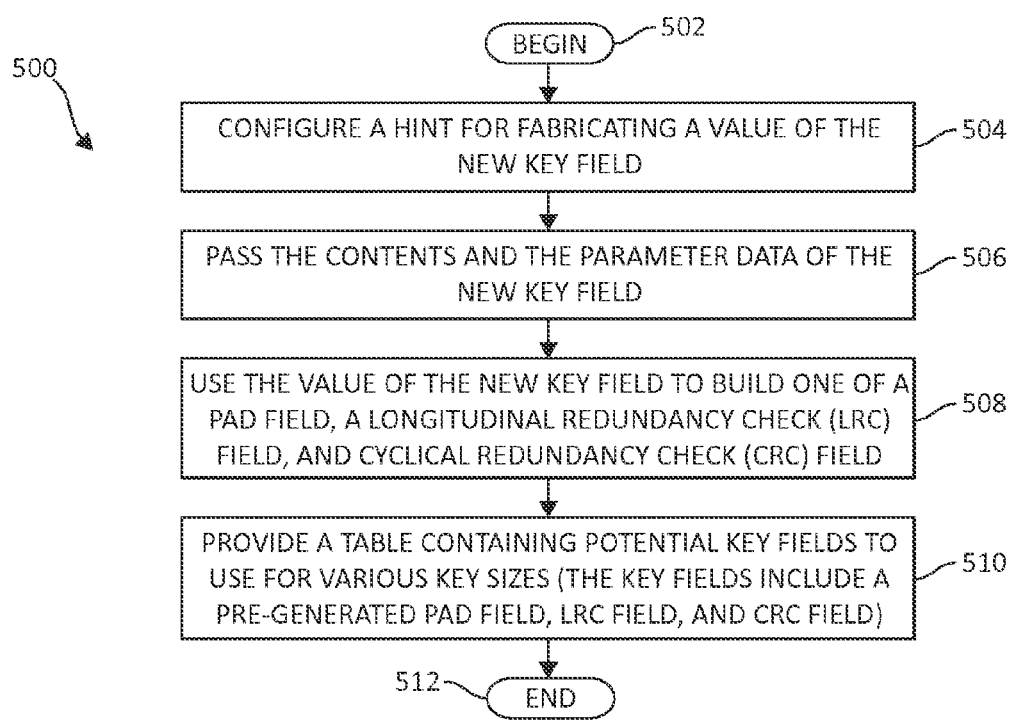
FIG. 5 is a flowchart illustrating an exemplary method 500 for providing a hint to fabricate a key field and key value.

FIG. 5 is a flowchart illustrating an exemplary method 500 for providing a hint to fabricate a key field and key value. The method 500 begins (step 502). A hint is configured for fabricating a new key field and the new key fields value (step 504). The method 500 will pass the contents and the parameter data of the value of the new key field (step 506). The value of the new key field is used to build one of a pad field, a longitudinal redundancy Check (LRC) field, and cyclical redundancy check (CRC) field (step 508). The method 500 will provide a table containing a plurality of potential key fields to use for a plurality of key sizes, wherein the plurality of key fields includes a pre-generated pad field, LRC field, and CRC field (step 510). The method 500 ends (step 512).

As an additional embodiment, the mechanisms of the illustrated embodiments may provide a hint to fabricate the key and the value of the key. In one embodiment, for example, a key field in WADS may be a single byte set to 0. To allow for an expansion and instructions of when a control unit or other processing device is permitted to fabricate the key field, the mechanisms of the illustrated embodiments, for example a control unit, may pass the contents of the key field with the hint as well as in parameter data. The mechanisms of the illustrated embodiments, such as the control unit, may use this unique value for the key field and build a pad field, a LRC field, and CRC field. Alternatively, for small enough key sizes, a table may be provided with the potential key fields and their pre-generated pad/CRC/LRC to be used. For example, for a single byte key field, the table would consist of 256 entries.

Figure 6:
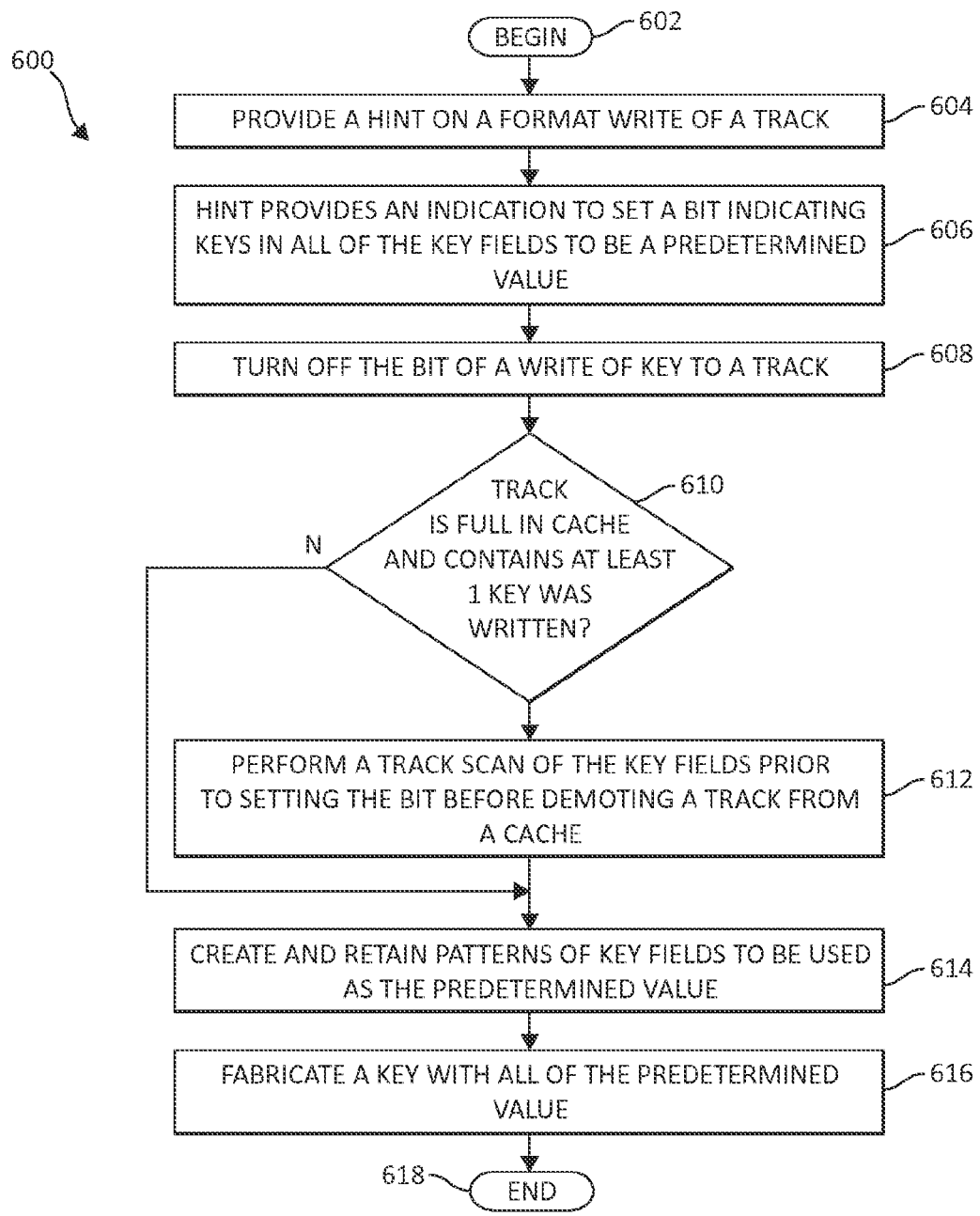
FIG. 6 is a flowchart illustrating an exemplary method 600 for providing a hint to fabricate a new key field on a format write of a track.

FIG. 6 is a flowchart illustrating an exemplary method 600 for providing a hint to fabricate a new key field on a format write of a track. The track may include a WADS track. The method 600 begins (step 602) with providing a hint on a format write of a track, for example, a WADS track (step 604). The hint provides an indication to set a bit indicating keys in all of the key fields to be a predetermined value (step 606). The method 600 may perform an operation to turn off the bit of a write of key to the track, if necessary (step 608). The method 600 may check and determine if the track is full in a cache and contains at least 1 key was written (step 610). If yes, the method 600 may perform a track scan of the key fields prior to setting the bit before demoting the track from a cache (step 612). The method 600 will create and retain multiple (or single) patterns of the key fields to be used as a predetermined value (step 614). A key is fabricated with all of the predetermined values (step 616). The method 600 will then end (step 618).

In one embodiment, as previously mentioned, rather than using a hint on each update write of a data field, there may be a hint on a format write of the track, for example, a WADS track. In one embodiment, by way of example only, this hint would allow the mechanisms of the illustrated embodiments, for example, the control unit, to set a bit that indicates the keys are zero in all key fields (the track format description (TFD) for fixed key length and data length having been previously used and set to 0). Since tracks, such as a WADS, may not update the key a write of key to a track would turn off this bit. If the track is fully in cache and at least 1 key was written the mechanisms of the illustrated embodiments would do a track scan of the key fields to have a chance at setting the bit before the track is demoted it from cache. Then because the TFD specifies the key is all 0, the control unit would know to fabricate a key of all 0s. This may apply whether the key length was 1 through 255 bytes. Since the key field contents would be known via this mechanism, a key field of all zeros may be safely fabricated. In addition, rather than limiting the key field to be all 0's, the mechanisms of the illustrated embodiments may expand the pattern of the key fields may be specified and retained in the TFD or other related metadata.

It is appreciated that terminology such as "mandatory", "required", "need" and "must" refer to implementation choices made within the context of a particular implementation or application described here within for clarity and are not intended to be limiting since in an alternative implantation, operation, construction, or implementation, the same elements might be defined as not mandatory and not required or might even be eliminated altogether. In addition, a component or structure mentioned or described herein in the singular context may only be described in a particular implementation or application for clarity and by way of example and is not intended to be limiting because multiple components or structures may be utilized in an alternative implantation, operation, construction, and/or implementation of the methods and systems described herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for fabricating key fields by a processor device in a computing storage environment, comprising:
   providing a hint to fabricate a new key field as an alternative to reading Count-Key-Data (CKD) data in order to change the key fields for eliminating track stages for tracks and CKD command chains, and overwriting a previous key field and updating the CKD data;
   providing the hint to fabricate a value of the new key field;
   passing one of a plurality of contents and a plurality of parameter data of the value of the new key field; and
   storing the fabricated new key field rather than refabricating a new key field upon issuance of a qualifying request, wherein the stored fabricated new key field is used when writing a record into a cache.

2. The method of claim 1, further including adding the new key field to one of a plurality of parameters and a plurality of commands, wherein the new key field includes a known format and content, and the hint is one of the plurality of commands.

3. The method of claim 1, further including providing a restriction on the hint allowing for a rejection of the hint.

4. The method of claim 1, further including performing at least one of:
   recognizing the hint,
   processing the hint,
   fabricating one of the new key field and a header.

5. The method of claim 1, further including performing at least one of:
- using the value of the new key field to build one of a pad field, a longitudinal redundancy check (LRC) field, and a cyclical redundancy check (CRC) field, and
- creating a table containing a plurality of potential key fields to use for a plurality of key sizes, wherein the plurality of key fields includes a pre-generated pad field, LRC field, and CRC field.

6. The method of claim 1, further including processing the hint by a control unit.

7. The method of claim 1, further including providing the hint on a format write of a track to allow for performing at least one of:
- setting a bit indicating a plurality of keys in at least one of a plurality of key fields to be a predetermined value,
- turning off the bit by a write of key to the track,
- performing a track scan of the plurality of key fields prior to setting the bit before demoting the track from a cache,
- creating and retaining a plurality of patterns of the plurality key fields to be used as the predetermined value, and
- fabricating the new key field with the predetermined value.

8. A system for fabricating key fields in a computing storage environment, comprising:
- a processor device operable in the computing storage environment, wherein processor device is adapted for:
- providing a hint to fabricate a new key field as an alternative to reading Count-Key-Data (CKD) data in order to change the key fields for eliminating track stages for tracks and CKD command chains, and overwriting a previous key field and updating the CKD data;
- providing the hint to fabricate a value of the new key field;
- passing one of a plurality of contents and a plurality of parameter data of the value of the new key field; and
- storing the fabricated new key field rather than refabricating a new key field upon issuance of a qualifying request, wherein the stored fabricated new key field is used when writing a record into a cache.

9. The system of claim 8, wherein the processor device is further adapted for adding the new key field to one of a plurality of parameters and a plurality of commands, wherein the new key field includes a known format and content, and the hint is one of the plurality of commands.

10. The system of claim 8, wherein the processor device is further adapted for providing a restriction on the hint allowing for a rejection of the hint.

11. The system of claim 8, wherein the processor device is further adapted for performing at least one of:
- recognizing the hint,
- processing the hint,
- fabricating one of the new key field and a header.

12. The system of claim 8, wherein the processor device is further adapted for performing at least one of:
- using the value of the new key field to build one of a pad field, a longitudinal redundancy check (LRC) field, and a cyclical redundancy check (CRC) field, and
- creating a table containing a plurality of potential key fields to use for a plurality of key sizes, wherein the plurality of key fields includes a pre-generated pad field, LRC field, and CRC field.

13. The system of claim 8, wherein the processor device is a control unit for processing the hint and fabricating the new key field.

14. The system of claim 13, wherein the processor device is further adapted for providing the hint on a format write of a track to allow for performing at least one of:
- setting a bit indicating a plurality of keys in at least one of a plurality of key fields to be a predetermined value,
- turning off the bit by a write of key to the track,
- performing a track scan of the plurality of key fields prior to setting the bit before demoting the track from a cache,
- creating and retaining a plurality of patterns of the plurality key fields to be used as the predetermined value, and
- fabricating the new key field with the predetermined value.

15. A computer program product for fabricating key fields in a computing storage environment by a processor device, the computer program product comprising a non-transitory computer-readable storage medium having computer-readable program code portions stored therein, the computer-readable program code portions comprising:
- a first executable portion for providing a hint to fabricate a new key field as an alternative to reading Count-Key-Data (CKD) data in order to change the key fields for eliminating track stages for tracks and CKD command chains, and overwriting a previous key field and updating the CKD data;
- a second executable portion for providing the hint to fabricate a value of the new key field;
- a third executable portion for passing one of a plurality of contents and a plurality of parameter data of the value of the new key field; and
- a fourth executable portion for storing the fabricated new key field rather than refabricating a new key field upon issuance of a qualifying request, wherein the stored fabricated new key field is used when writing a record into a cache.

16. The computer program product of claim 15, further including a fifth executable portion for adding the new key field to one of a plurality of parameters and a plurality of commands, wherein the new key field includes a known format and content, and the hint is one of the plurality of commands.

17. The computer program product of claim 15, further including a fifth executable portion for providing a restriction on the hint allowing for a rejection of the hint.

18. The computer program product of claim 15, further including a fifth executable portion for performing at least one of:
- recognizing the hint,
- processing the hint,
- fabricating one of the new key field and a header.

19. The computer program product of claim 15, further including a fifth executable portion for performing at least one of:
- using the value of the new key field to build one of a pad field, a longitudinal redundancy check (LRC) field, and a cyclical redundancy check (CRC) field, and
- creating a table containing a plurality of potential key fields to use for a plurality of key sizes, wherein the plurality of key fields includes a pre-generated pad field, LRC field, and CRC field.

20. The computer program product of claim 16, further including a fifth executable portion for providing the hint on a format write of a track to allow for performing at least one of:
- setting a bit indicating a plurality of keys in at least one of a plurality of key fields to be a predetermined value,
- turning off the bit by a write of key to the track,
- performing a track scan of the plurality of key fields prior to setting the bit before demoting the track from a cache,
- creating and retaining a plurality of patterns of the plurality key fields to be used as the predetermined value, and
- fabricating the new key field with the predetermined value.

* * * * *